Aug. 12, 1969
W. J. DENVER
3,460,181
DIP STICK GUIDE AND WIPER
Filed Jan. 4, 1968
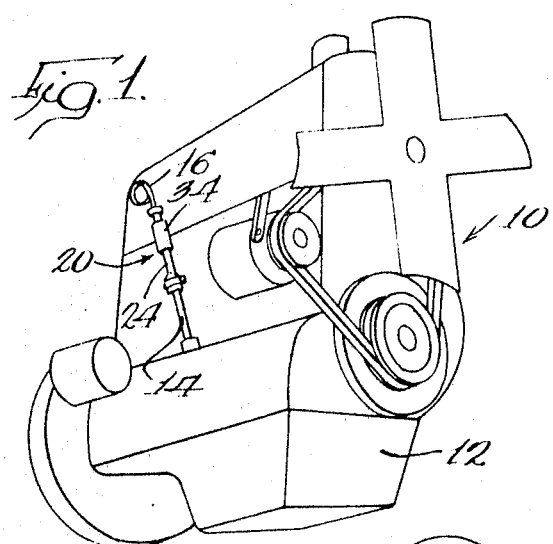
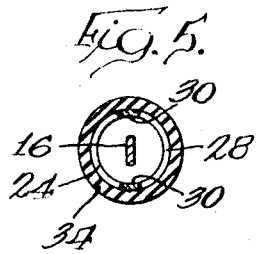
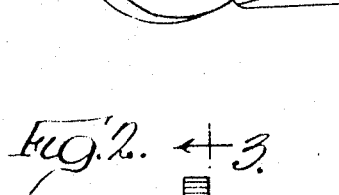
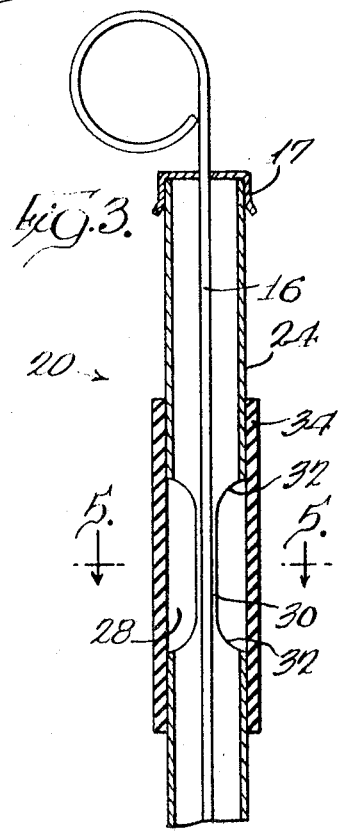
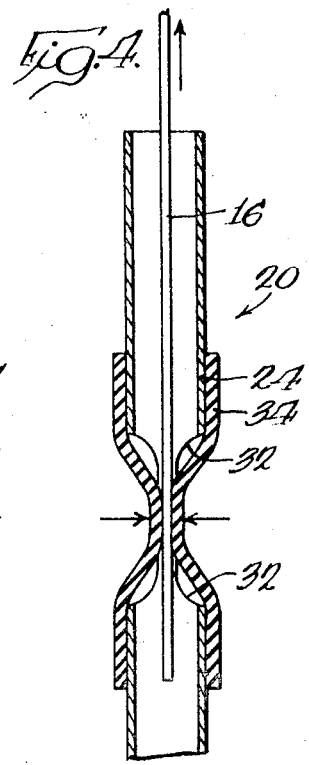
Inventor:
William J. Denver
By Gary Parker
Juettner, Pigott & Cullinan
Attys

United States Patent Office 3,460,181
Patented Aug. 12, 1969

3,460,181
DIP STICK GUIDE AND WIPER
William J. Denver, 601 Nicholson St.,
Joliet, Ill. 60435
Filed Jan. 4, 1968, Ser. No. 695,748
Int. Cl. G01f 23/04
U.S. Cl. 15—210                3 Claims

ABSTRACT OF THE DISCLOSURE

A combined dip stick guide tube and wiper that may be provided as original equipment on the reservoir or as an attachment to a conventional dip stick guide tube. In the preferred embodiment, the tube part of the combination comprises a tubular element having apertures or openings in the opposite sides thereof, and the wiper comprises a pliant tube slipped over the apertured portion of the tubular element, said pliant tube being manually squeezable through said openings into engagement with the dip stick, so as to wipe the stick clean as it is withdrawn from the reservoir, and upon release flexing out of the tubular element to accommodate normal unrestricted subsequent passage of the dip stick through the tube to and from the reservoir for purposes of liquid level measurement.

The present invention relates to means for wiping the dip stick used to measure the liquid level in reservoirs, such as the oil level in engine crankcases, power transmissions and the like; and especially to a combined guide tube and wiper for the dip stick.

Background of the invention

To measure the oil or other liquid level in a reservoir, it is conventional to extend a dip stick to the bottom of or a pre-determined level in the body of liquid. Frequently, especially in automotive vehicles and the like, the reservoir is provided with a guide tube for properly positioning the dip stick in the reservoir and for storing the same when it is not in use. To take a measurement, it is necessary to remove the stick, wipe it clean, re-insert it in the guide tube and/or reservoir, again remove the stick to take the measurement, and finally restore the stick to its original position. Quite frequently, a cloth or paper towel for wiping the stick is not conveniently at hand and oil is wasted and dripped about in an objectionable manner.

The object of this invention is to simplify dip stick measurements and mitigate the stated objections of the prior practice.

In use, the pliant tube is always at hand to serve a wiping function and its association with the guide tube insures automatic return to the reservoir of the fluid wiped from the stick. Also, by virtue of the location of the wiper element, it is not necessary to completely remove the stick from the guide tube on the wiping stroke of the stick, thereby saving substantial time and energy.

The following detailed description and the accompanying drawings, submitted to acquaint those skilled in the art with the best mode presently contemplated by me for carrying my invention into practice, will reveal the several objects and advantages of the invention.

The Drawings

FIGURE 1 is a perspective view of an internal combustion engine illustrating the dip stick guide tube and wiper of this invention associated therewith;

FIGURE 2 is an enlarged, fragmentary side view, partly in section and partly in elevation, of the tube and wiper and the dip stick;

FIGURE 3 is a vertical longitudinal section taken substantially on line 3—3 of FIGURE 2;

FIGURE 4 is a view similar to FIGURE 3 illustrating performance of the wiping function pursuant to the invention; and FIGURE 5 is a cross-sectional view taken substantially on line 5—5 of FIGURE 3.

Description

The internal combustion engine 10 illustrated in FIGURE 1 includes the conventional crankcase 12 serving as an oil reservoir, and said crankcase is provided with a conventional guide tube 14 for receiving a dip stick 16 adapted to measure the level of the oil in the crankcase.

The combined guide tube and dip stick wiper means of this invention may directly constitute the engine's guide tube 14, or may be in the form of an accessory attachable to said tube. In FIGURE 1, I have shown an accessory form of device, indicated generally at 20, comprising a guide tube extension 24 telescopically associated with the engine guide tube 14 and secured thereto by a conventional tube clamp 26. For the purpose, the lower end of the tubular element 24 may be of enlarged diameter to telescope over the tube 14 and may be split to facilitate clamping of said enlarged lower end to said tube. To accommodate this extension, a portion of the tube 14 of a length equal to the length of the tube 24 may be cut off to permit use of the original dip stick, or the tube 14 may be left in its original condition and an enlarged dip stick substituted for the original. Alternatively, the original guide tube 14 may be apertured in the manner described below to directly constitute the tubular element 24 of my combined apparatus.

Whether an integral part of the engine, or an attachment thereto, the device 20 of this invention is, in its preferred embodiment, constructed as shown in FIGURES 2 to 5. Specifically, the tubular element 24 is apertured adjacent its upper end; approximately one to two inches from its upper end to facilitate manual access to such apertured portion. In the preferred structure, the element 24 is a rigid, non-corrosive metal tube and apertures 28 are formed in opposed side wall portions of the tube. The apertures 28 are of sufficient circumferential extent to permit maximum access to the interior of the tube while at the same time maintaining sufficient material or struts 30 bridging said apertured portion to sustain the rigidity of the tube. Preferably, the upper and lower edges of the apertures 28 are curved or beveled, as indicated at 32, for a purpose to be described.

Associated with the apertured portion of the tubular element 24 is a wiper element 34, formed of a resilient or pliant material such that the element normally assumes a position outside the tube 24 but which is adapted to be squeezed inwardly into the interior of the tube. In the preferred embodiment, the element 24 is in the form of a resilient tube of a length greater than the apertures 28 and is telescoped over the tube 24 in overlying relation to said apertures. The tube 34 may be secured in place by means of cement or a conventional clamp applied thereto over a solid or imperforate portion of the tube 24 below the apertures 28. Alternatively, and preferably, the resilient tube 34 is selected of an internal diameter slightly smaller, 1/16 to 1/8 inch smaller, than the outer diameter of the rigid tube 24 whereby the tube 34 is resiliently secured and sealed to the tube 24 both above and below the apertures.

The resilient wiper element may be selected from any of a large number of appropriate materials, but it is preferred that such material be non-absorbent, oil-resistant, highly pliable and capable of retaining its resiliency and pliability over a long service life even in the environment of an internal combustion engine. One material I have found to be very practical is neoprene.

In use, the dip stick 16 is inserted into the tube 24–34 in the conventional manner, with the cap portion 17 of the stick closing the upper end of the tube 24 as shown in FIGURES 1, 2 and 3. When it is desired to measure the oil level in the crankcase 12, or any other liquid reservoir with which my device may be employed, the operator grasps the finger grip of the dip stick in one hand and with the thumb and forefinger of the other hand squeezes inwardly on the resilient sleeve or tube 34 as indicated by the arrows in FIGURE 4. This squeezing action brings opposed surfaces of the resilient sleeve into engagement with the opposite sides of the dip stick, and being pliant, the resilient material conforms to and circumferentially encompasses the dip stick in wiping relationship therewith. Then, the dip stick is withdrawn, whereupon the stick is wiped clean by the pliant material 34. The oil or other liquid wiped from the stick is returned directly to the crankcase or reservoir through the interior of the tube 24, and the stick is withdrawn clean. Actually, the stick need not be completely withdrawn, the operator simply stopping the withdrawal movement when he senses the end of the stick between his thumb and forefinger.

The purpose of the beveled or curved portions 32 of the apertures 28 is to provide conformity of the apertures to the operator's thumb and finger, thereby to afford a physical sense of proper alignment and squeezing action and also to facilitate complete engagement of the pliant material with the stick.

After the stick has thus been wiped clean, the operator removes his fingers from the element 34 whereupon the element returns to its normal position as shown in FIGURES 2 and 3, so that the operator may thereafter proceed to re-insert the stick in the reservoir and remove the stick from the tube (without wiping action) to take the liquid level measurement.

It is thus apparent that the invention provides a highly efficient and improved mode of taking liquid level measurements with a dip stick, and that the objects and advantages of the invention are attained in a convenient, economical and practical manner.

While I have shown and described what I regard to be the preferred embodiment of my invention, it is to be appreciated that various changes, rearrangements and modifications may be made therein without departing from the scope of the invention, as defined by the appended claims.

I claim:

1. A dip stick guide and wiper for a liquid reservoir, consisting essentially of a rigid tubular element for communication with the reservoir and reception of a dip stick, said tubular element having apertures in opposing wall portions thereof below the top thereof, and a pliant wiper element comprising a tube telescoped over the apertured portion of said tubular element, said tube being non-fibrous, essentially non-absorbent and of an internal diameter less than the external diameter of said tubular element for resiliently engaging said tubular element in sealed relation thereto below and above said apertures, said tube being squeezable through both said apertures between the thumb and finger of an operator into the interior of said tubular element for wiping contact with a dip stick in said tubular element and normally flexing itself outwardly of the interior of said tubular element to accommodate unobstructed passage of the dip stick through said tubular element.

2. A dip stick guide and wiper as set forth in claim 1, said apertures in said tubular element having beveled edges facilitating the squeezing action by the thumb and finger.

3. A dip stick guide and wiper as set forth in claim 1, adapted for attachment to the dip stick guide of a liquid reservoir, said tubular element having a lower end portion for telescopic engagement with the guide, and means for releasably clamping together the telescoped portions of said tubular element and the guide.

References Cited

UNITED STATES PATENTS

| 1,814,075 | 7/1931 | Burkhardt | 15—210.2 X |
| 3,098,254 | 7/1963 | Rose | 15—210.2 |
| 3,205,525 | 9/1965 | Birtzer | 15—210.2 |
| 3,387,314 | 6/1968 | Shirk | 15—210.2 |

WALTER A. SCHEEL, Primary Examiner

LEON G. MACHLIN, Assistant Examiner

U.S. Cl. X.R.

73—290